United States Patent [19]

Ransley et al.

[11] 4,377,322
[45] Mar. 22, 1983

[54] FIBER OPTIC COUPLER

[75] Inventors: Richard G. Ransley, Auburn; William H. Sahm, III, Syracuse, both of N.Y.

[73] Assignee: General Electric Company, Syracuse, N.Y.

[21] Appl. No.: 201,350

[22] Filed: Oct. 27, 1980

[51] Int. Cl.³ .............................................. G02B 5/14
[52] U.S. Cl. ................................................ 350/96.2
[58] Field of Search ................. 350/96.2, 96.15, 96.17, 350/96.22

[56] References Cited
U.S. PATENT DOCUMENTS 4,273,413  6/1981  Bendiksen et al. ................. 350/96.2

Primary Examiner—Eli Lieberman
Attorney, Agent, or Firm—Robert J. Mooney

[57] ABSTRACT

A low cost connector for coupling a fiber optic wave guide with a semiconductor emitter and detector device is described which positions the wave guide and the detector in mutually perpendicular orientation so that the detector device may be directly connected to a printed circuit wiring board with the wave guide exiting the connector parallel to the board. Locating and positioning means with the connector allow a particularly low cost molded semiconductor package to be employed without modification for misaligning of the package halves.

1 Claim, 5 Drawing Figures

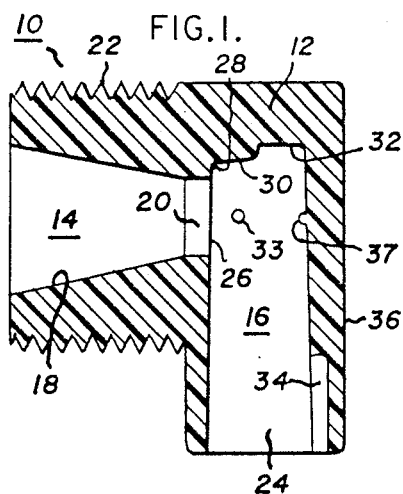
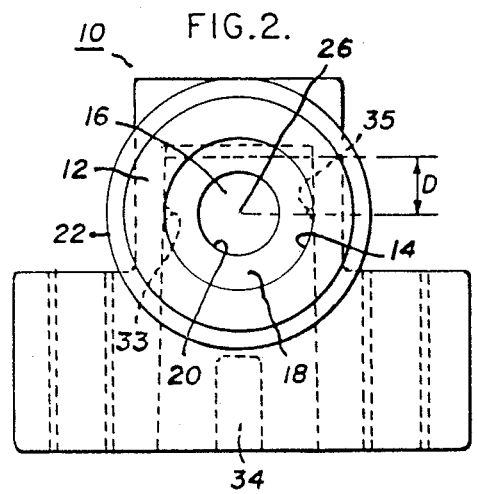
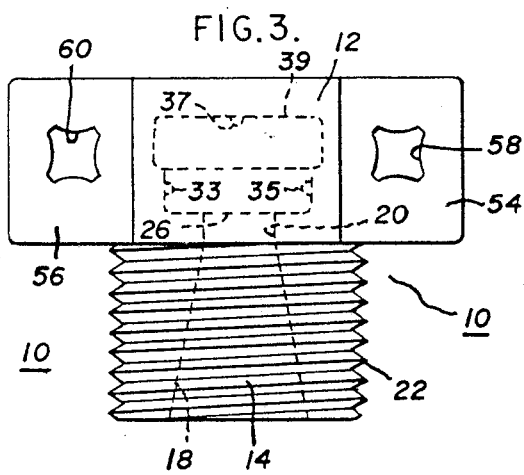
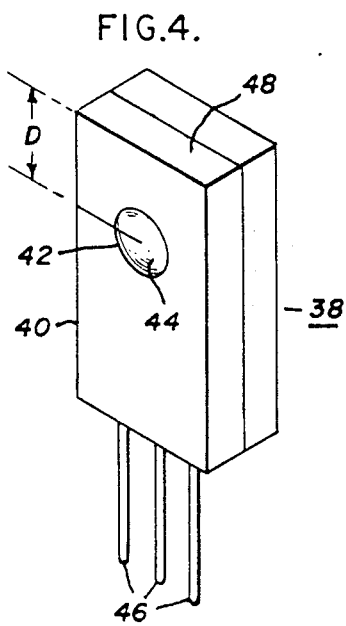
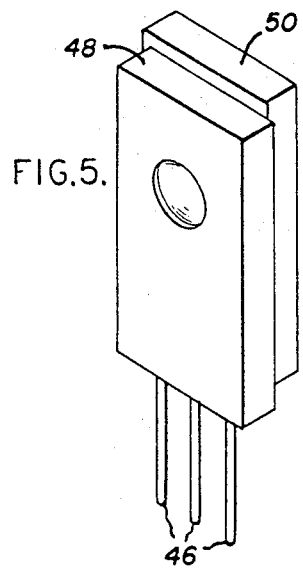

FIBER OPTIC COUPLER

This invention relates in general to fiber optic connectors and more particularly to a low cost coupler for joining a fiber optic waveguide with an emitter or detector device.

As the cost of producing fiber optic waveguide as well as the cost of producing emitter and detector devices declines, many new applications for such waveguide and devices which heretofore have been impractical, primarily because of high cost, are being recognized. In order to take advantage of the unique attributes of the fiber optic medium such as noise immunity and low attenuation, for the transmission of information in such cost-sensitive applications, it is necessary to provide a low cost, high performance coupler for interfacing such devices with fiber optic waveguides.

Common to virtually all prior art couplers has been their use of relatively expensive cylindrical lensed metal can emitter or detector device packages disposed in coaxial relationship with the fiber optic waveguide. In such couplers the waveguide extends from the connector along the common axis in one direction while the device leads extend parallel to the axis in the opposite direction. In many applications, such as where circuit board mounting of the coupler assembly is desired with the fiber optic waveguide disposed parallel to the board surface, it is necessary to form a right angle bend either in the device leads or in the waveguide itself thus either increasing the attenuation where the waveguide is bent, or adding an additional assembly step where the device leads are bent.

A further disadvantage of known connectors is that the structural complexity thereof in order to insure alignment between the free end of the fiber optic waveguide and the active portion of the semiconductor device, is high and the tolerances which must be achieved increase the cost of the connector. Further, it is disadvantageous for the emitter or detector device to physically touch the free end of the fiber optic waveguide inasmush as the waveguide may easily be scratched or displaced both reducing the efficiency of coupling. Accordingly, the package must be designed to provide the proper spacing between the device and the free end of the waveguide. Still further, the free end of the waveguide must be accurately aligned with the active portion of the device in order to maximize the transfer of energy therebetween. Precise locating structures are required which further add to the cost of such connectors.

A lower cost semiconductor emitter or detector is available in a plastic package which may contain a recessed lens. Such packages expose a light sensitive portion or light emitting portion of a semiconductor device housed therein through a major face of a body having a generally rectangular cross section. Two or more electrical leads extend from a minor face of the body. Heretofore, such device packages have been incompatible with available fiber optic connectors and have not been usable in conjunction with fiber optic waveguides.

It is an object of this invention to provide a low cost fiber optic waveguide to emitter or detector device coupling assembly which permits the orthogonal juxtapositioning of the waveguide and the device for increased ease of mounting the connector.

It is another object of this invention to provide a fiber optic waveguide to device connector assembly which exhibits substantial mechanical simplification over prior art devices and requires only a single device aligning surface.

It is further object of this invention to provide a fiber optic waveguide to device coupler which is compatible with low cost, rectangular device packages.

Briefly stated and in accordance with a presently preferred aspect of this invention a fiber-optic-waveguide to emitter or detector device coupler includes a waveguide receiving chamber having a first open end for receiving a waveguide assembly, and means for securing said waveguide assembly to the connector. A second chamber, orthogonal to the first chamber, and communicating therewith through a first opening is provided in the connector body for receiving a low cost rectangular cross section semiconductor emitter or detector device along an axis perpendicular to the axis of the fiber optic assembly receiving chamber. The second chamber is preferably of rectangular cross section and may be slightly enlarged at the open end thereof to facilitate automatic insertion of the semiconductor device. The second chamber is further provided with a penetration determining first surface at the inner end thereof and spaced a predetermined distance from the first opening and one or more locating projections on the back and side walls of the chamber so that upon insertion of a semiconductor device into the second chamber, an active portion of the device is aligned in said first opening with a free end of the fiber optic waveguide. The connector is preferably provided with a mounting flanges extending from the body portion in a direction orthogonal to both the first and second chambers, the mounting flange being provided with holes therethrough for accepting mounting fasteners. The connector may thereby be bolted or otherwise secured directly to a circuit board or the like through which board the electrical leads of the emitter or detector device may conveniently pass for connection to ancillary circuits.

The features of the invention which are believed to be novel are pointed out with particularity in the appended claims. The invention itself, however, both as to its organization and method of operation together with further objects and advantages thereof may best be understood by reference to the following description taken in connection with the accompanying drawing in which:

FIGS. 1–3 are side, front and top views of a fiber optic coupler assembly in accordance with this invention.

FIGS. 4 & 5 illustrate a semiconductor emitter or detector device of the type with which this invention is designed to operate.

Referring now to FIGS. 1–3, wherein like elements are designated by like reference numerals, a fiber optic waveguide to semiconductor emitter or detector device coupler assembly is designated generally at 10. The coupler is preferably formed of plastic or other similar low cost easily manufactured material by any well known method for forming such materials such as molding or the like. Coupler 10 includes a main body portion 12 which defines two cavities therein, a waveguide receiving first cavity 14 for receiving a fiber optic waveguide assembly and a second cavity 16 for receiving a semiconductor device. It is a feature of this invention that semiconductor emitters and detectors may be interchangeably inserted into the same coupler assembly without the need for modification thereof. Hereinafter device shall refer to either emitters or detectors. Waveguide receiving chamber 14 includes a first frusto-conical portion 18 and a second cylindrical portion 20. Frusto-conical portion 18 is operative to receive a free end of a fiber optic waveguide plug assembly and to guide the same into engagement with connector 10. Preferably the plug assembly includes a ferrule portion having a shape corresponding to the shape of chamber 14 and which, in operation, is engaged in relatively tight fitting relationship therewith. Locking means such as threaded portion 22 of connector 10 are adapted to mate with a complimentary locking portion of the plug assembly for semi-permanent attachment thereto.

It will be understood by those skilled in the art that while the particular shape of first chamber 14 is selected herein to be compatible with a commonly employed family of fiber optic connectors as exemplified by the Optimate series of connectors manufactured by AMP, Inc., variations in the particular form of input cavity 14 may be made by those skilled in the art to accommodate other types of plugs or ferrules.

Connector body 10 further includes semiconductor device receiving chamber 16 therein of generally rectangular cross section and disposed in orthogonal relation to waveguide assembly receiving chamber 14. Preferably, device receiving chamber 16 has a generally rectangular cross section and may conveniently be slightly flared towards a device receiving open end 24 having a somewhat enlarged rectangular cross section for enhancing the automatic insertion of devices into chamber 16. Chambers 14 and 16 communicate through open end 26 of cylindrical portion 20 of fiber optic waveguide assembly receiving chamber 14. While it is presently preferred to provide an opening 26 coextensive with the end dimensions of cylindrical region 20, a smaller opening defined, for example, by an iris member (not shown) may be provided if desired. Device receiving chamber 16 further includes penetration determining surface 28 disposed at the innermost end of chamber 16 and spaced a predetermined distance D from the center of opening 26. Surface 28 is shaped to mate with an upper locating surface of the semiconductor device with which connector 10 is employed. Upper surface 30 of chamber 16 is slightly inclined in an upward direction joining penetration determining surface 28 with recess 32. Recess 32 is preferably provided for receiving, in non interference relationship, an upwardly extending portion of a device inserted into chamber 16 which need not, therefore, be precisely dimensionally controlled. Similarly, the rear portion of chamber 16 is enlarged laterally to provide a device misalignment relief portion 39 of chamber 16 and the forward portion is provided with locating projections 33 and 35 on the side walls thereof for centering the active portion of the device in opening 26. A similar locating projection 37 is positioned on rear wall 36 of chamber 16 for urging the device against surface 28 and against the forward surface of chamber 16.

Connector 10 is further provided with first and second mounting flanges 54 and 56 extending from the body of connector 10 on either side of device receiving opening 24. Preferably flanges 54 and 56 are provided with first and second openings 58 and 60 therein for receiving fastner means such as screws, rivets, bolts or the like.

Connector 10 further includes lead receiving recess 34 preferably disposed on rear wall 36 thereof for allowing one or more electrical leads of the semiconductor device to be bent to a position out of line with the remaining lead or leads such as is required by certain patterns of circuit board traces. For example, where the semiconductor detector device is a transistor having three leads including a base lead as well as a collector and emitter lead connected to an external circuit, typically a triangular shaped pattern of holes for receiving such leads is provided on a circuit board which requires that where a collinear lead arrangement is provided in the detector package that one of the leads be bent from the collinear position for attachment to the circuit board.

Referring now to FIG. 4, a semiconductor device 38, either an emitter or detector, of the type with which the connector of this invention is intended to function, is illustrated. The device includes a body portion 40 having an aperture 42 therein which is preferably a lensed aperture communicating with an active portion 44 of a semiconductor device located within the body. Two or more leads generally designated 46 extend from one end of the body and are internally connected to the semiconductor device in a conventional manner. The device includes an upper locating surface 48 from which surface aperture 42 is spaced a predetermined distance D identical to the distance D illustrated in FIGS. 1-3.

It is convenient to manufacture devices such as device 38 by attaching the semiconductor element to a lead frame and molding a plastic body around said lead frame and said element by conventional molding techniques. Such molding processes generally include inserting the lead frame with device attached thereto into a first mold half, closing the mold with a second mold half and injecting a plastic molding compound into the cavity formed thereby. It is a feature of such a molding process that while alignment between the lead frame and the lower mold half may be easily maintained, precise alignment between the upper and lower mold halves may vary somewhat and in fact it is desirable to have the tolerance thereon be relatively noncritical so as to minimize the cost of the mold and molding operation. Where a misalignment of the mold halves occurs a body such as illustrated in FIG. 5 may result wherein the rear portion of the body overlaps the forward portion in some direction. The degree of overlap is exaggerated in the Figure for purposes of illustration. Such overlapping of the mold halves may produce body portion 50 which extends above surface 48 and which is accommodated in connector 10 by recessed portion 32. It will be appreciated that FIG. 5 represents an exemplary overlap possibility, the others being the case where back portion 50 of the body is recessed, at the top surface thereof from the front portion and the cases of overlap to the sides, left or right and various combinations of top/bottom, left/right misalignment. Similar accommodation in misalignment relief chamber 39, therefore, is provided in the coupler assembly for left/right misalignment of the back mold half.

Note that critical spacing with the waveguide is maintained by the device being urged towards the front wall of the chamber by projection 37.

While this invention has been described in connection with a presently preferred embodiment thereof, it will be recognized by those skilled in the art that certain modification and changes may be made therein without departing from the true spirit and scope of the invention. Accordingly, the invention is intended to be defined solely by the appended claims.

What is claimed is:

1. An adapter for connecting an optoelectronic semiconductor device in efficient radiation-coupling relation with a fiber optic waveguide comprising a one-piece plastic body having an externally threaded cylindrical portion provided with a coaxial frustoconical first chamber for receiving the end portion of a fiber optic waveguide, said body having a second chamber of generally rectangular cross section having a permanently open outer end for direct insertion and withdrawal of a semiconductor device, said second chamber being arranged generally orthogonal to said first chamber for removable insertion of the semiconductor device therein and communicating adjacent the inner end of one of its sidewalls with said first chamber, first position-determining projections on the interior sidewalls of said second chamber arranged and adapted for engagement with a semiconductor device inserted in said second chamber so as to align the optoelectronic operative portion of the semiconductor device installed in said second chamber with a fiber optic waveguide installed in said first chamber, and second position-determining projections on the inner walls of said second chamber frictionally engageable with a semiconductor device inserted therein to determine the spacing of said device from the end of an optical fiber installed in said first chamber.

* * * * *